April 12, 1932.  J. BLOCK  1,853,164
TREE SUPPORT
Filed March 21, 1929
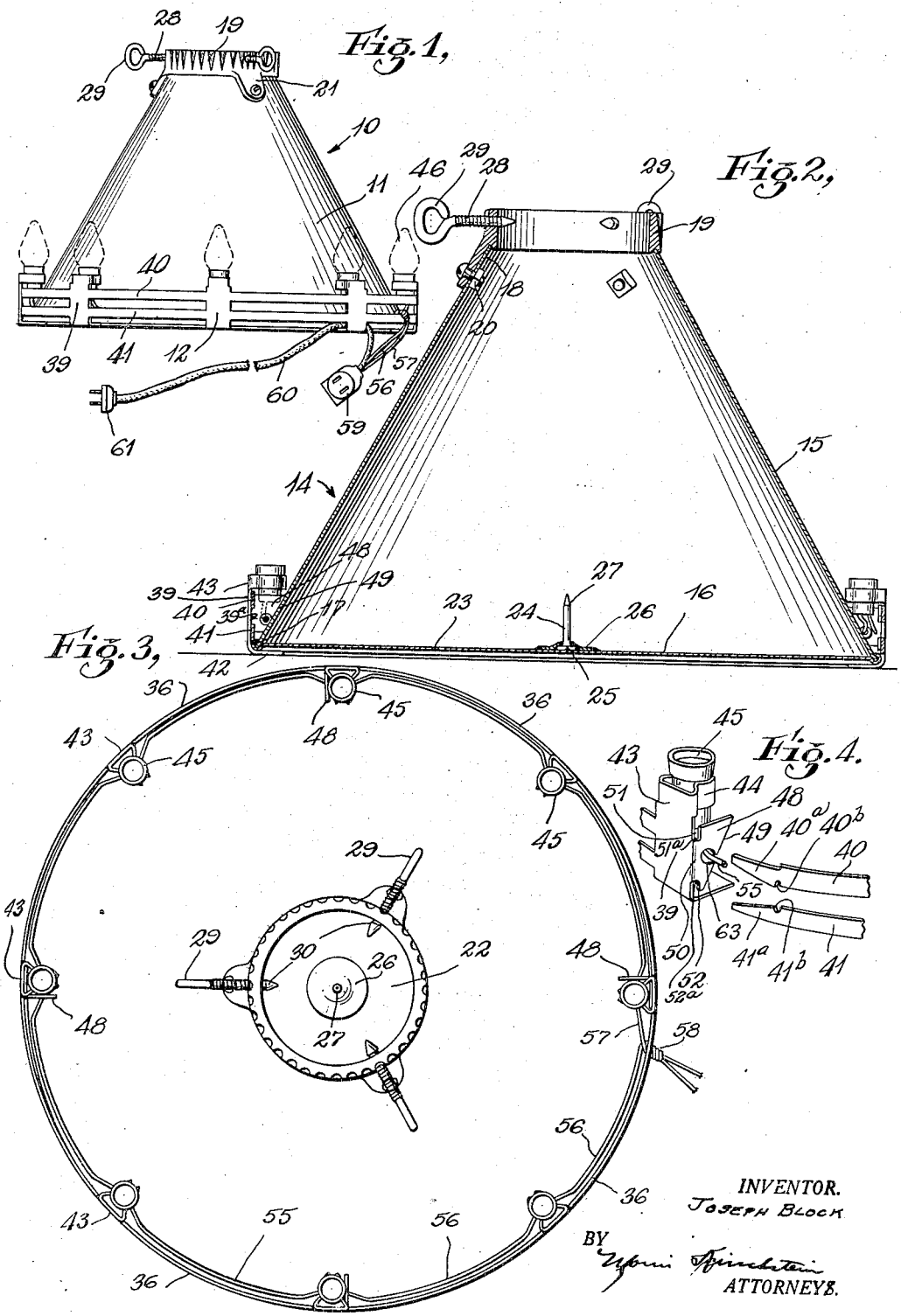
INVENTOR.
JOSEPH BLOCK
BY
ATTORNEYS.

Patented Apr. 12, 1932

1,853,164

UNITED STATES PATENT OFFICE

JOSEPH BLOCK, OF BROOKLYN, NEW YORK, ASSIGNOR TO NOMA ELECTRIC CORPORATION, OF NEW YORK, N. Y., A CORPORATION OF NEW YORK

TREE SUPPORT

Application filed March 21, 1929. Serial No. 348,732.

This invention relates to supports for trees, the like, and is directed for example to an ornamental, illuminated Christmas tree stand.

An object of this invention is to provide an ornamental device of the character described adapted for keeping the Christmas tree moist and fresh, and having means for illuminating and beautifying the tree, and which shall yet be constructed for obviating the usual fire hazards connected with Christmas tree illumination.

A further object of this invention is to provide in a device of the character described a water containing body particularly adapted for mounting a highly decorative lighting unit at the base thereof.

Another object of this invention is to provide in a device of the character described, an illuminating unit having means for removably securing the same at the base of a conical shaped body.

A still further object of this invention is to provide a neat, compact and rugged device of the character described, which shall be relatively inexpensive to manufacture, easy to assemble, and yet practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is an elevational side view of a tree support embodying the invention;

Fig. 2 is an elevational cross-sectional view of the support taken thru the central axis thereof;

Fig. 3 is a top plan view of the device; and

Fig. 4 is a perspective view of a portion of the illuminating unit illustrating the method of assembling the same.

Referring in detail to the drawings, 10 designates a tree support embodying the invention in the form of a decorative Christmas tree stand which is here seen to comprise a body 11 on which is mounted, in a manner hereinafter described, the illuminating unit 12.

Said body 11 comprises a water receptacle 14, preferably of sheet metal, and having a tapering side wall 15 preferably in the shape of a frustum of a cone, and a bottom wall or base 16 attached to said side wall by a beaded watertight seam 17. At the upper edge 18 thereof, said wall 15 is provided with a relatively thick collar 19 secured to said wall in any suitable manner as by bolts 20 extending thru said wall and thru a number of spaced depending ears 21 integrally formed with said collar.

Said stand 10 is provided with means for supporting a Christmas tree or other like object in upright position. To this end the collar 19 is formed with a central opening 22 large enough to receive the stem or trunk of the tree (not shown) or any suitable post it is desired to support. Attached centrally to the inner surface 27 of said base 16, is a nail or spike 24 having a head 25 retained against said base, as by a ring member 26 soldered or otherwise secured to said base. Said spike presents a sharp upstanding point 27 adapted to be driven into the bottom of the tree trunk upon positioning the tree in the support 10. For aligning the tree in vertical position, said collar 19 is provided with a plurality of equi-angularly spaced, radial screws 28 having screw threaded connection with said collar. Said screws 28 are provided with looped handles 29 for manipulating the same and dull points 30 adapted to abut the sides of the tree trunk.

The illuminating unit 12 is mounted at the lower edge of conical wall 15 adjacent the base 16, thus being remote from the tree and thereby greatly reducing the danger of igniting portions of the tree and causing fires. Said unit 12 comprises a circular member 35 preferably made of stamped sheet metal and is formed of a plurality of similar segmental sections 36 interconnected in a manner hereinafter appearing. Each of said sections comprises a plurality of upstanding equi-angularly spaced portions 39 interconnected by a plurality of spaced, parallel circumferential strips 40, 41. Extending inwardly from each of said portions 39 and bent substantially at right angles thereto, is a portion 42 adapted to engage the under portion of the beaded edge 17 and base 16. Said portions 39 preferably extend upwardly beyond the circumferential strips as at 43 and having integrally formed therewith, inwardly extending bifurcated spring clamps 44 adapted to support electric lamp sockets 45. Due to the inward inclination of conical wall 15, the sockets 45 may be supported inwardly of the outer edge 17 of the base and thus in close proximity to said conical wall. Mounted in said sockets 45 are small decorative lamps 46, preferably of tapering shape to simulate the flame of a Christmas candle. Said sockets 45 are wired in series circuit in a manner hereinafter appearing.

As shown in Fig. 3 for the purpose of illustration only, the unit 12 is made up of four sections 36 each provided with two lamp socket clamps 44. Obviously, however, any suitable number of such sections having any suitable number of socket supports, depending upon the ornamental effect it is desired to produce. Preferably, however, each section 36 terminates in a socket supporting portion 39, 43, 44 at one end thereof, and with free ended strips 40, 41 at the opposite end thereof. Said end strips 40, 41 may be provided with tapering tongues or tabs 40a, 41a notched or slotted as at 40b, 41b. Bent radially inwardly from end portion 39 of each section is a triangularly shaped plate 48 having an inclined edge 49 adapted to abut conical wall 15. The bent edge 50 at the junction of portions 39 and 48 is preferably slotted as at 51, 52 for receiving said tongue 40a, 41a in assembling said sections. Said tongues may be inserted thru said slots 51, 52 to lie adjacent the inner surface 39a of said end portion 39, edge portions 51a, 52a adjacent said slots 51, 52 being received in slots 40b, 41b respectively and thus providing an interengaging connection between said sections for securely attaching said sections together. The circular lighting unit 12 may thus be quickly and easily built up on the body 14.

All of the lamp sockets 45 are interconnected in series circuit by conductors 55 terminating in end portions 56, 57 preferably twisted or tied as at 58 and attached to a multiple outlet socket 59. A duplex cable 60 interconnects said socket 59 with an attachment plug 61 adapted for connection to a source of electric power. Power for illuminating other portions of the tree may be tapped from socket 59. Triangular plates 48 may be notched as at 63 for receiving conductors 55.

Obviously the lighting unit 12 may be assembled apart from the body 14 before the portions 42 are bent inwardly. The built up unit may thus be first fitted over the body 14, the portions 42 being thereafter bent under the base 16 for attaching the unit to said body.

It will thus be seen that there is provided a device in which the several objects of this invention are achieved and which is well adapted to meet the conditions of practical use.

As various possible embodiments might be made of the above invention, and as various changes might be made in the embodiment set forth, it is to be understood that all matter herein set forth or shown in the accompanying drawings is to be interpreted as illustrative and not in a limiting sense.

Having thus described my invention I claim as new and desire to secure by Letters Patent:

1. In a device of the character described, in combination, a supporting member having a tapering wall and a base, and an illuminating unit mounted at the base of said member, said unit being provided with a portion extending under and engaging said base and portion extending over and engaging said tapering wall.

2. In a device of the character described, in combination, a supporting member having a tapering wall and a base and an illuminating unit mounted at the base of said member, said unit being provided with portions extending under and engaging said base, a portion extending over and engaging said tapering wall, and electric lamp socket supporting members extending inwardly of the outer edge of said base.

3. An illuminating unit comprising a stamped sheet metal ring having an integral resilient lamp socket clamping portion extending inwardly of said ring, a portion spaced from said first mentioned portion and extending inwardly of said ring and a portion having an inclined underedge disposed between said first named portions.

4. A Christmas tree support comprising in combination, a hollow conical container having a flat base and an illuminating unit therefor, comprising a metal ring having a portion extending inwardly and engaging the underside of the said base, a lamp socket holding portion spaced from said first named portion extending inwardly of said ring and disposed adjacent the conical wall of said container, and a portion having an inclined edge substantially in contact with said conical wall.

In testimony whereof I affix my signature.

JOSEPH BLOCK.